United States Patent [19]
Kadowaki

[11] Patent Number: 5,915,075
[45] Date of Patent: Jun. 22, 1999

[54] IMAGE PROCESSING APPARATUS FOR CONVERTING INPUT COLOR CHART DATA INTO COLOR DATA FOR AN OUTPUT DEVICE

[75] Inventor: Toshihiro Kadowaki, Kawasaki, Japan

[73] Assignee: Canon Kabushiki Kaisha, Tokyo, Japan

[21] Appl. No.: 08/757,950

[22] Filed: Nov. 22, 1996

Related U.S. Application Data

[63] Continuation of application No. 08/096,447, Jul. 26, 1993, abandoned.

[30] Foreign Application Priority Data

Jul. 27, 1992 [JP] Japan .................................. 4-199745
Jan. 14, 1993 [JP] Japan .................................. 5-005222

[51] Int. Cl.[6] .............................. G06F 15/00; H04N 1/60
[52] U.S. Cl. ......................... 395/109; 358/518; 358/523
[58] Field of Search ..................................... 395/101, 109, 395/114, 800; 345/428, 429, 431, 432, 433, 153, 154; 358/500, 502, 503, 515, 518, 512, 517, 117, 523; 382/162, 163, 167; 364/526; 399/28, 39, 178, 298, 321, 344

[56] References Cited

U.S. PATENT DOCUMENTS

| | | | |
|---|---|---|---|
| 4,839,722 | 6/1989 | Barry et al. ............................. | 358/523 |
| 4,888,812 | 12/1989 | Dinan et al. ............................ | 382/7 |
| 4,963,898 | 10/1990 | Kadowaki et al. ..................... | 346/157 |
| 4,966,461 | 10/1990 | Hooper ................................... | 364/526 |
| 5,107,332 | 4/1992 | Chan ...................................... | 358/80 |
| 5,218,621 | 6/1993 | Liao et al. .............................. | 395/131 |
| 5,268,754 | 12/1993 | Van de Capelle et al. ............ | 358/527 |
| 5,309,246 | 5/1994 | Barry et al. ............................ | 358/459 |
| 5,313,267 | 5/1994 | MacFarlane et al. .................. | 364/526 |
| 5,343,311 | 8/1994 | Morag et al. .......................... | 358/518 |
| 5,416,890 | 5/1995 | Beretta ................................... | 395/131 |
| 5,528,261 | 6/1996 | Holt et al. .............................. | 345/150 |

OTHER PUBLICATIONS

QuarkXpress, Reference Manual, 1986–91 by Quark Inc.

*Primary Examiner*—Scott Rogers
*Assistant Examiner*—Gabriel I. Garcia
*Attorney, Agent, or Firm*—Fitzpatrick, Cella, Harper & Scinto

[57] ABSTRACT

An image processing apparatus has an image input unit which inputs image data corresponding to an input color space, and a color space conversion unit which converts input image data into output image data corresponding to an output color space. A correspondence data input unit inputs representative point correspondence data for relating representative points in an input color space to representative points in an output color space. The color space conversion characteristics of the color space conversion unit are determined on the basis of a plurality of representative correspondence data input from the correspondence data input unit. The plurality of representative point correspondence data are color chart correspondence data which relate specific color chart numbers to the data values of the respective color component data constituting output image data.

12 Claims, 13 Drawing Sheets

FIG. 2A

| COLOR CHART NUMBER | INPUT IMAGE DATA VALUE | | | |
|---|---|---|---|---|
| | R | G | B | |
| 0 | 0 | 0 | 0 | (BLACK) |
| 1 | 255 | 8 | 2 | (RED) |
| 2 | 20 | 230 | 20 | (GREEN) |
| 3 | 130 | 140 | 130 | (GRAY) |
| ⋮ | ⋮ | ⋮ | ⋮ | |
| 127 | 255 | 255 | 255 | (WHITE) |

FIG. 2B

| COLOR CHART NAME | INPUT IMAGE DATA VALUE | | | |
|---|---|---|---|---|
| | R | G | B | |
| "BLACK" | 0 | 0 | 0 | (BLACK) |
| "RED" | 120 | 0 | 0 | (RED) |
| "GREEN" | 10 | 127 | 5 | (GREEN) |
| ⋮ | ⋮ | ⋮ | ⋮ | |
| "WHITE" | 127 | 127 | 127 | (WHITE) |

FIG. 3

| COLOR CHART NUMBER | OUTPUT IMAGE DATA VALUE | | | | |
|---|---|---|---|---|---|
| | C | M | Y | K | |
| 0 | 109 | 103 | 101 | 255 | (BLACK) |
| 1 | 3 | 255 | 250 | 0 | (RED) |
| 2 | 255 | 0 | 248 | 0 | (GREEN) |
| 3 | 35 | 33 | 31 | 140 | (GRAY) |
| ⋮ | ⋮ | ⋮ | ⋮ | ⋮ | |
| 127 | 0 | 0 | 0 | 0 | (WHITE) |

FIG. 6

| SPECIFIC COLOR SPACE DATA VALUE | | | INPUT IMAGE DATA VALUE | | | |
|---|---|---|---|---|---|---|
| R | G | B | R | G | B | |
| 0 | 0 | 0 | 0 | 0 | 0 | (BLACK) |
| 250 | 10 | 5 | 255 | 8 | 2 | (RED) |
| 15 | 220 | 14 | 20 | 230 | 20 | (GREEN) |
| 100 | 108 | 103 | 130 | 140 | 130 | (GRAY) |
| ⋮ | ⋮ | ⋮ | ⋮ | ⋮ | ⋮ | |
| 255 | 255 | 255 | 255 | 255 | 255 | (WHITE) |

FIG. 9A

| COLOR CHART NUMBER | IMAGE DATA VALUE | | | |
|---|---|---|---|---|
| | R | G | B | |
| 0 | 0 | 0 | 0 | (BLACK) |
| 1 | 255 | 8 | 2 | (RED) |
| 2 | 20 | 230 | 20 | (GREEN) |
| 3 | 130 | 140 | 130 | (GRAY) |
| ⋮ | ⋮ | ⋮ | ⋮ | |
| 127 | 255 | 255 | 255 | (WHITE) |

FIG. 9B

| COLOR CHART NAME | IMAGE DATA VALUE | | | |
|---|---|---|---|---|
| | R | G | B | |
| "BLACK" | 0 | 0 | 0 | (BLACK) |
| "RED" | 120 | 0 | 0 | (RED) |
| "GREEN" | 10 | 127 | 5 | (GREEN) |
| ⋮ | ⋮ | ⋮ | ⋮ | |
| "WHITE" | 127 | 127 | 127 | (WHITE) |

IMAGE PROCESSING APPARATUS FOR CONVERTING INPUT COLOR CHART DATA INTO COLOR DATA FOR AN OUTPUT DEVICE

This application is a continuation of application Ser. No. 08/096,447 filed Jul. 26, 1993, now abandoned.

BACKGROUND OF THE INVENTION

1. Field of the Invention

The present invention relates to an image processing apparatus and, more particularly, to an image processing method and apparatus and an electronic device for receiving color image data corresponding to an arbitrary color space from a host computer, a color scanner, or the like, processing the image data, and outputting the image data to a color image forming apparatus.

2. Related Background Art

An image processing apparatus for receiving color image data from a host computer or the like and outputting the image data to a color printer to form an image is known.

In general, image data held by a host computer have various color spaces. For example, there are image data and the like which can be reproduced as desired images when the data are read by a scanner having a specific color space or when the data are displayed on a monitor having a specific color space. That is, even identical image data values of images expressed by R, G, and B data input from host computers do not necessarily represent the same color when the host computers differ in type or when the sources of the image data are different even if the host computers are identical to each other. In other words, there are a plurality of color spaces expressed by R, G, and B data. Color printers form images by using specific CMYK toners. For this reason, one specific color printer can express only one specific output color space.

Therefore, in order to form image data having various input color spaces in accordance with colors intended by a user, conversion from input color spaces to output color spaces must be performed in accordance with the characteristics of input images.

In a conventional method, parameters for LUT and masking circuits for performing color conversion from R, G, and B data into C, M, Y, and K data are stored in a RAM in advance, thereby performing conversion.

The following problems, however, are posed in the above-described conventional method in which image processing parameters used for a printing operation are stored in a RAM to express the characteristics of an input image.

1) There are a plurality of types of parameters for image processing. Of these parameters, optimal parameters can be discriminated only by a trial-and-error method, and wasteful trial printing operations are required. In addition, it is difficult to define the relationship between a change in each parameter and an effect on an output image. It is, therefore, difficult to determine which parameters should be changed.

2) Since a conversion result is a color space unique to each printer, different optimal parameters are required for different types of printers. In other words, optimal parameters need to be found for each type of printer.

That is, in the conventional method, it is difficult to set optimal parameters for the above-mentioned color space conversion.

As described above, there are various types of image forming apparatuses for receiving color raster image data from a host computer and the like and printing images. In this case, raster image data is image data describing an image as a group of pixels. Each pixel is described by various color component data values, e.g., 8-bit R, G, and B (Red, Green, and Blue) data, a total of 24 bits, or by 8-bit C, M, Y, and K (Cyan, Magenta, Yellow, and blacK) data, a total of 32 bits.

When image data are to be formed and edited in a host computer, various colors are displayed on the display screen, and colors to be used are selected from the displayed colors, thus forming and editing images. In this case, since images are held in the form of color raster image data, image data values (e.g., R, G, and B color component values) corresponding to the respective colors are predetermined, and the images are edited by using image data values corresponding to selected colors. The obtained raster image data are then transferred to the image forming apparatus to form images.

As in the conventional method, however, when designated colors are converted into raster image data on the computer side, conversion is performed regardless of the color characteristics of the image forming apparatus, thus posing the following problems.

1) Since the operator forms images on the basis of displayed colors, the image data values change depending on the type of display unit.

2) Displayed colors differ from printed colors because the color characteristics of a display unit are generally different from those of an image forming apparatus.

3) Even with the same input image data, different types of image forming apparatuses produce different output images.

4) As the color characteristics of an image forming apparatus change over time, an output image changes in color.

With regard to the problem in 1) above, it is solved by using a specific color chart group as colors which can be selected. A color chart is obtained by selecting a specific color group and assigning a number to each color. A color can be specified by a color chart number. Each color chart is available as a printed matter. Therefore, if an image is formed on the basis of the colors of color charts on a printed matter by using colors displayed on a display unit only as reference colors, constant image data values can be obtained regardless of the type of display unit. In general, however, an image data value has different meanings for each type of printer, and hence the drawbacks 2) to 4) are left unsolved.

SUMMARY OF THE INVENTION

The present invention has been made in consideration of the above situation, and has as its object to provide an image processing apparatus capable of easily setting desired image processing parameters, and a method thereof.

It is another object to provide an image processing apparatus capable of performing color reproduction faithful to the intention of a user, and a method thereof.

In order to achieve the above objects, according to the present invention, there is provided an image processing apparatus comprising image input means for inputting input image data corresponding to an input color space, color space conversion means for converting input image data into output image data corresponding to an output color space, and correspondence data input means for inputting representative point correspondence data for relating a representative point in the input color space to a representative point in the output color space, wherein color space conversion characteristics of the color space conversion means are determined on the basis of a plurality of representative point correspondence data input from the correspondence data input means.

It is still another object of the present invention to provide an electronic device such a host computer suitably used to obtain a color hard copy faithful to the intention of a user.

It is still another object of the present invention to provide an image processing apparatus which can automatically obtain a faithful color hard copy regardless of the characteristics of an output device for outputting a color image, and a method thereof.

In order to achieve the above objects, according to a preferred embodiment of the present invention, there is provided an image forming apparatus comprising color image forming means for forming a color image corresponding to color image data supplied from an external electronic device, holding means for holding a profile of the color image forming means, and output means for outputting the profile to the external electronic device.

The above and other objects, features, and advantages of the present invention will be apparent from the following detailed description taken in conjunction with the accompanying drawings and the appended claims.

BRIEF DESCRIPTION OF THE DRAWINGS

FIGS. 2A and 2B are views for explaining the correspondence data of color chart numbers and input image data;

FIG. 3 is a view for explaining the correspondence data of color chart numbers and output image data;

FIG. 6 is a view showing the correspondence data of specific color space data and input image data;

FIGS. 9A and 9B are views for explaining the correspondence data of color chart numbers and input image data;

DETAILED DESCRIPTION OF THE PREFERRED EMBODIMENTS (First Embodiment)

Figure 1:
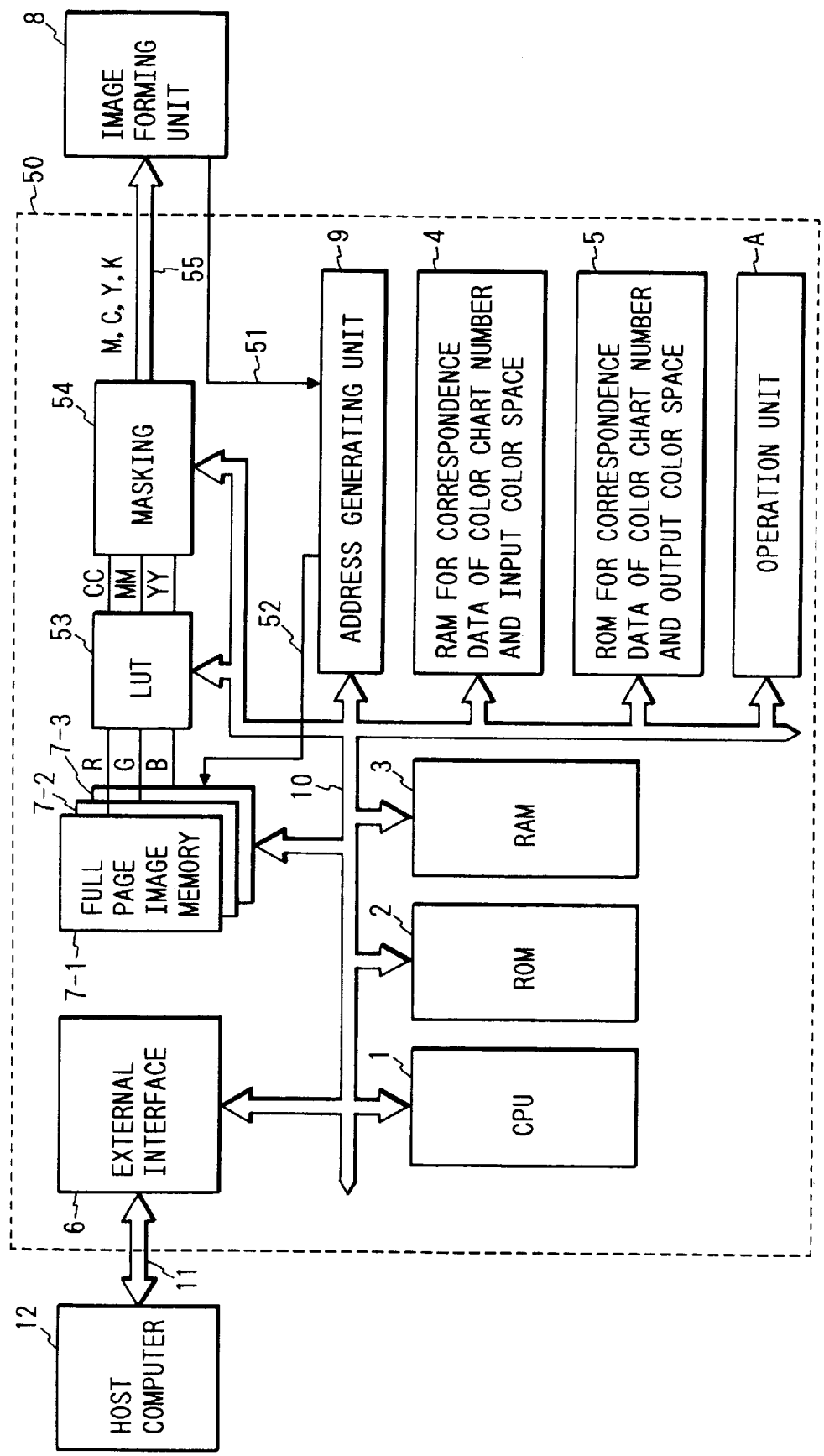
FIG. 1 is a block diagram showing an image processing apparatus according to the first embodiment of the present invention.

FIG. 1 is a block diagram showing an image processing apparatus 50 according to the first embodiment of the present invention.

As shown in FIG. 1, color image data transmitted from a host computer 12 through an interface 11 and an external interface 6 are written in full page image memories 7-1 to 7-3 by a CPU 1. In this case, a ROM 2 is used to hold programs, and a RAM 3 is used as a work RAM. The CPU 1 controls the respective components in the apparatus through a CPU bus 10.

The full page image memories 7-1 to 7-3 hold R (Red), G (Green), and B (Blue) color components and have a capacity of one page, 8 bits per pixel for each color component. That is, the full page image memories 7-1 to 7-3 are image memories for holding R, G, and B image data.

When all the image data required for printing one page are set in the full page image memories 7-1 to 7-3, the CPU 1 instructs an image forming unit 8 to start a print operation.

The image forming unit 8 is, for example, an electrophotographic full color printer and field-sequentially forms images constituted by M (Magenta), C (Cyan), Y (Yellow), and K (blacK) components. When the print operation is started, an address generating unit 9 generates a read address 52 for read-accessing the full page image memories 7-1 to 7-3 on the basis of a sync signal 51 generated by the image forming unit 8. The sync signal 51 includes a horizontal sync signal and a vertical sync signal.

R, G, and B data read out from the full page image memories 7-1 to 7-3 in accordance with this address are subjected to gradation conversion in an LUT circuit 53 to be converted into CC, MM, and YY data. These data are then subjected to color masking processing, UCR processing, and the like in a masking circuit 54 to be converted into C, M, Y, and K data.

A RAM 4 is a memory for holding correspondence data of color chart numbers and specific points in an input color space. A color chart number is a number assigned to each color chart of a specific color chart group. A specific color as a color chart can be designated by designating a corresponding color chart number. As a specific color chart group, for example, the pantone (registered trade name) is well known. In addition to this color chart group, various color chart lists are available from printing companies. Such color chart groups include several tens to several hundreds color charts depending on their types. A specific point in the input color space is expressed by a combination of numerical values of image data of the respective color components. FIGS. 2A and 2B show an example of the correspondence data. Each combination of R, G, and B data values of input image data is related to a specific one of the color chart numbers. FIG. 2A shows a correspondence list in which each color chart number of company A corresponds to a specific one of the combinations of numerical values of image data of an input image a. The combinations of numerical values of image data corresponding to these color chart numbers, i.e., the correspondence list, change in accordance with the type of color space of an input image. In this embodiment, these correspondence data are transmitted from the host computer 12 and are held by the RAM 4. The data may be input from an operation unit A of the image processing apparatus or may be input from an IC card or the like. The RAM 4 may be integrated with the work RAM 3, and the addresses of data stored in the RAMs 3 and 4 may be separately managed. In this manner, the color characteristics of an input image are expressed by only the relationship between color charts and combinations of numerical values of image data of the respective color components. Therefore, information about the color characteristics of an image forming unit is not required on the host computer side. Since color charts are colors themselves to human eyes, they are preferable as means for allowing the operator to express intended colors. When an image is to be formed in the host computer, colors are designated by color chart numbers, and the color chart numbers and the formed image data values are held in a list in the host computer. In addition, as described above, this list is transmitted from the host computer 12 to the RAM 4 to be held therein, thereby easily forming the correspondence data of color chart numbers and specific points in an input color space.

FIG. 2B shows a correspondence list in which each color chart of company B corresponds to a specific one of the combinations of numerical values of image data of an input image b. In this manner, one apparatus may correspond to a plurality of color chart groups, and a color chart group to be used may be selected. As shown in FIG. 2B, color charts may be specified by character strings representing color chart names or the like instead of color chart numbers.

A ROM 5 in FIG. 1 is a memory for holding the correspondence data of color chart numbers and specific points in an output color space. A specific point in the output color space is expressed by a combination of numerical values of the respective color components of image data. FIG. 3 shows an example of this correspondence data. Each combination of C, M, Y, and K data values of output image data is related to a specific one of the color chart numbers. In the embodiment, this correspondence data is written, as data unique to the image forming unit, in a nonvolatile memory such as the ROM 5 in the image processing unit at the time of shipment. However, this data may be transmitted from the image forming unit 8 to the host computer or the like, or may be input from an operation unit (not shown), an IC card, or the like. Alternatively, the data may be transmitted from the host computer 12. When a plurality of types of image forming units can be connected to the same image processing unit, correspondence data are transmitted from the image forming units, or a plurality of types of parameters corresponding to the plurality of types of image forming units which can be connected to the image processing unit are set in the ROM 5 so as to be selectively used in accordance with the type of unit actually connected to the image processing unit. Such a selecting operation may be automatically or manually performed. The ROM 5 may be integrated with the program ROM 2. Furthermore, when correspondence data is to be externally input, an EEPROM or a RAM may be used instead of a ROM.

The CPU 1 calculates parameters for the above-mentioned LUT circuit and masking circuit on the basis of the correspondence data of the color chart numbers and the specific points in the input space, stored in the RAM 4, and the correspondence data of the color chart numbers and the specific points in the output space, stored in the RAM 5, and sets the parameters in the LUT circuit 53 and the masking circuit 54.

A method of calculating parameters for the LUT circuit 53 will be described below. This circuit 53 is used to perform gradation conversion of input R, G, and B images. The function of the circuit 53 is expressed by functions FR, FG, and FB of the following equations:

$CC=FR(R), 0 \leq R, CC \leq 255$ $MM=FG(G), 0 \leq G, MM \leq 255$ $YY=FG(B), 0 \leq B, YY \leq 255$ The default equations are:

$CC=255-R$ $MM=255-G$ $YY=255-B$

If the domain of input image data is different from a standard domain, e.g., each image data is expressed by a range of 0 to 127, i.e., 7 bits, as shown in FIG. 2B, the circuit 53 is used to normalize each image data into data expressed by a range of 0 to 255, i.e., 8 bits. The domain of input data can be determined from, e.g., data of a color chart representing black and data of a color chart representing white of the color charts. In the case shown in FIG. 2B, for example, the domain of input data is expressed by the following equation:

$CC=2\times(127-R)$

The gamma value, i.e., linearity, of some of input images may not conform to the image forming unit. The LUT circuit 53 is used to perform gamma conversion of such an input image. In order to check the gamma characteristics of input data, the image data values of input and output data corresponding to color charts, of all the color charts, which represent gray colors having different densities are checked. The densities of each input data and each output data are obtained by using a proper equation, e.g., "$D_{in}=255-(R+G+B)/3$".

If we let $D_{out}[i]$ be the density value of output data corresponding to each color chart; and $D_{in}[i]$, the density value of input data corresponding to each color chart, in the following equation:

$ERR=\Sigma(D_{out}[i]-255\times(D_{in}[i]/255)^a)^2$ then a coefficient a with which a mean square error ERR becomes minimum is obtained by sequentially changing the value of coefficient a from 0.5 to 2.0. This coefficient a is calculated by the CPU 1. Gamma conversion may be performed as follows by using the coefficient $\underline{a}$:

$CC=255-255\times(R/255)^a$ $MM=255-255\times(G/255)^a$ $YY=255-255\times(B/255)^a$ The above-described two cases respectively apply when the domain of input data is different from that of output data, and when one of input and output data is a power of the other. In addition to the above-mentioned models, several models associated with the relationship between input data and output data may be set. Of these models, a model with which the error can be minimized may be employed together with a coefficient. For example, a reduction in error can sometimes be achieved with a model in which input and output data have a LOG relationship.

The masking circuit 54 is used to convert gradation-converted C, M, and Y images into C, M, Y, and K images and is also used to convert the color tone of an input image into a color tone which the image forming unit 8 has. That is, the above-mentioned gradation conversion is performed in the direction of density, but the masking circuit 54 performs conversion in the direction of hue. The function of the masking circuit 54 is expressed by a 4×4 matrix operation as follows (KK=min (CC, MM, YY)):

$$\begin{bmatrix} C \\ M \\ Y \\ K \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} \begin{bmatrix} CC \\ MM \\ YY \\ KK \end{bmatrix}$$

The default values of the respective parameters of this matrix in this embodiment are:

$$\begin{bmatrix} C \\ M \\ Y \\ K \end{bmatrix} = \begin{bmatrix} 1.0 & 0.0 & 0.0 & -0.5 \\ 0.0 & 1.0 & 0.0 & -0.5 \\ 0.0 & 0.0 & 1.0 & -0.5 \\ 0.0 & 0.0 & 0.0 & 1.0 \end{bmatrix} \begin{bmatrix} CC \\ MM \\ YY \\ KK \end{bmatrix}$$

Several methods of obtaining the optimal values of coefficients for the above-mentioned masking calculation from the correspondence data lists shown in FIGS. 2A and 2B and 3 may be employed. In the first method, for example, several models of masking coefficients are prepared, and calculations with respect to the input data of the respective color charts are performed by using these models. Of these models, a model with which the mean square error of the difference between the calculated output values and expected output values becomes minimum is selected.

According to the second method, the respective coefficients are changed little by little from standard conversion coefficients or conversion coefficients obtained by the first method as start points, thereby obtaining coefficients with which the mean square error is minimized.

Figure 4:
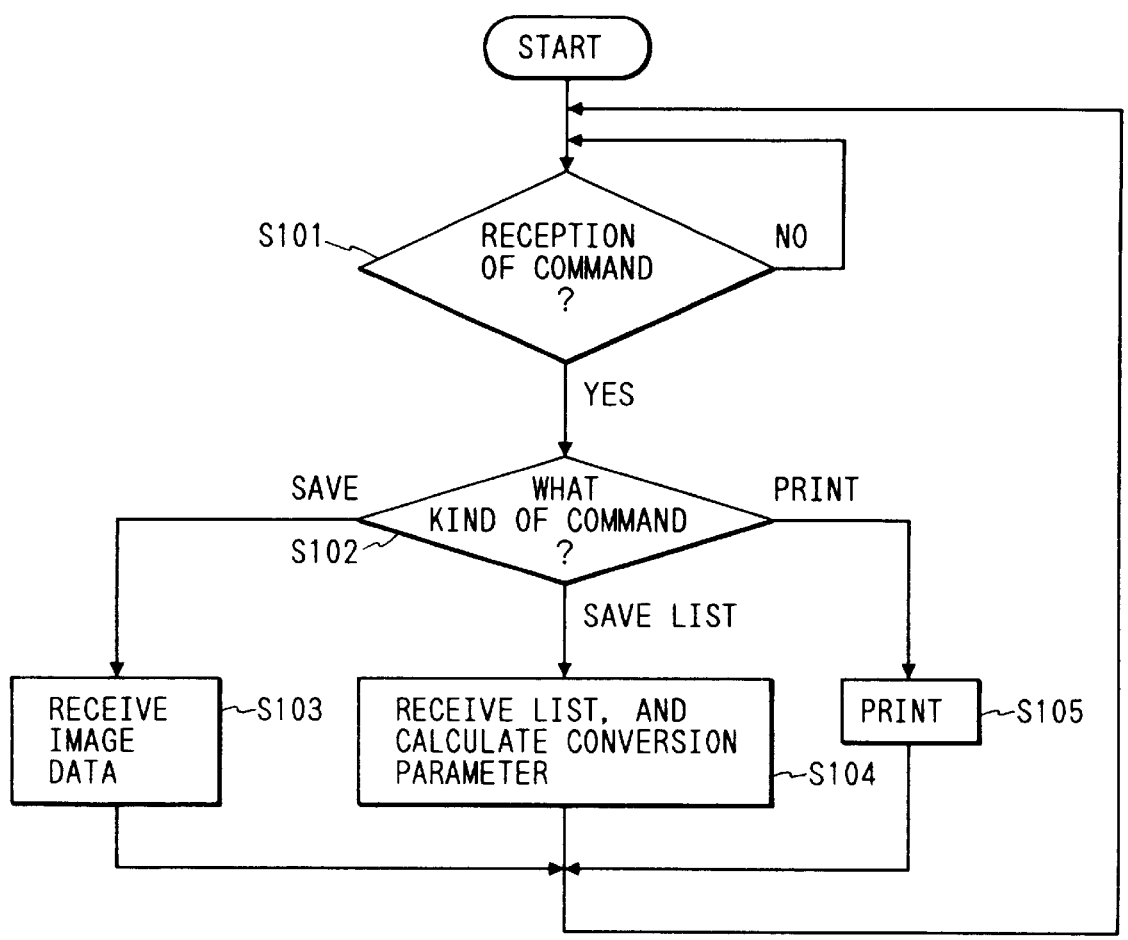
FIG. 4 is a flow chart showing a control sequence in the first embodiment.

FIG. 4 is a flow chart showing the flow of control of the image processing apparatus 50 in the first embodiment. In step S101, the flow waits until a command from the host computer 12 is received. When a command is received, a command type is discriminated in step S102. If the command is a "SAVE" command, image data is received from the host computer 12 and is written in the full page image memories 7-1 to 7-3 in step S103. If the command is a "SAVE_LIST" commands the list of "correspondence data of color chart numbers and specific points in input color space" shown in FIG. 2A is received from the host computer 12 and is written in the RAM 4 in step S104. Thereafter, as described above, coefficients to be set in the LUT circuit 53 and the masking circuit 54 are calculated on the basis of the data of this list, and are set in the respective circuits. If a "PRINT" command is received, the image forming unit 8 is started in step S105 to read out the contents of the full page image memories 7-1 to 7-3 and convert the readout data into data in an output color space by the LUT circuit 53 and the masking circuit 54. The resultant data are then supplied to the image forming unit.

In this embodiment, image data is sent through an image signal line 55 in accordance with the sync signal 51, i.e., an image is transferred by using a so-called video I/F. However, image data may be sent through a general asynchronous interface such as a GPIB or an SCSI. A general asynchronous interface is also used to send a print start command or the like to the image forming unit. Assume that a general asynchronous interface is used. In this case, if, for example, a printer having a high-speed engine, e.g., a laser beam printer, is used as the image forming unit, since the transfer speed is lower than the formation speed of the image forming unit, an image memory for speed conversion is required in the image forming unit.

(Second Embodiment)

Figure 5:
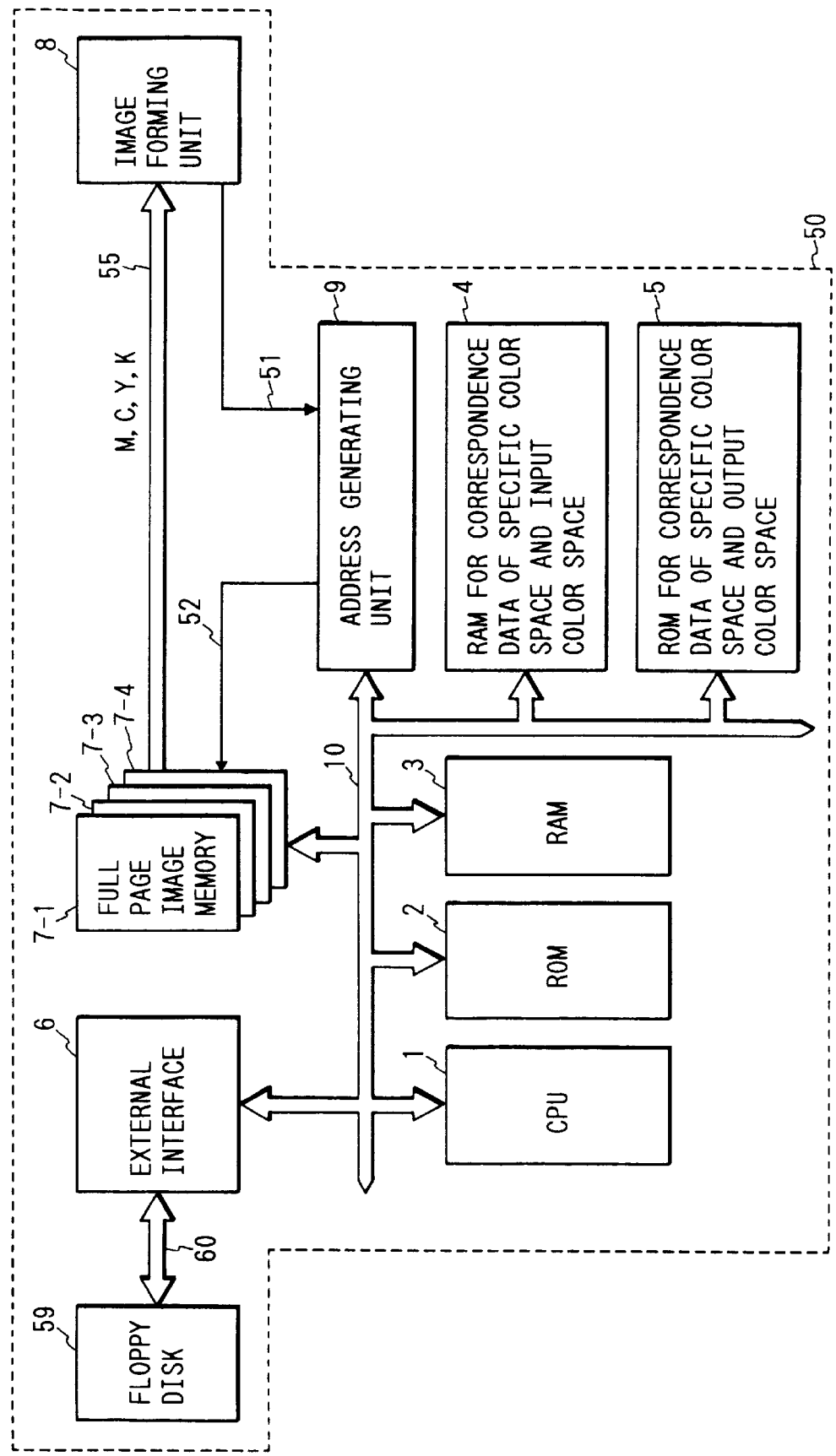
FIG. 5 is a block diagram showing an image processing apparatus according to the second embodiment of the present invention.

FIG. 5 is a block dprocessing apparatusage processing apparatus 50 according to the second embodiment of the present invention.

The second embodiment is different from the first embodiment in the following points. First, in the first embodiment, image data and correspondence data are received from an external host computer or the like by communication. In the second embodiment, image data and correspondence data are read from an internal floppy disk 59. Instead of a floppy disk, a hard disk or the like may be used. In addition, image data and correspondence data formed by an application program (not shown) may be exchanged in a main memory.

Second, in the first embodiment, the image processing apparatus 50 and the image forming unit 8 are designed as separate units. In the second embodiment, these units are integrated into one unit.

Third, in the first embodiment, color space conversion is performed by hardware. In the second embodiment, color space conversion is performed by a CPU 1 with software. That is, the CPU 1 reads out the contents of an image memory, performs color space conversion by calculation, and writes the result in the image memory. For this reason, an image memory 7 in this embodiment is constituted by four C, M, Y, and K planes (7-1 to 7-4). First, R, G, and B images received from a host computer are held by using three planes of the four planes 7-1 to 7-4 of the memory 7. The color space conversion result obtained by the CPU 1 is held by using the four C, M, Y, and K planes. Note that separate memories as an RGB memory and a CMYK memory may be used. When parameters for color space conversion are determined before image data are written in the image memory, image data received from the host computer may be directly subjected to color space conversion, and the data obtained by the conversion may be written in the image memory.

Fourth, in the first embodiment, an input color space and an output color space are related to each other through color charts. In the second embodiment, the two spaces are related to each other through a specific color space. As the specific color space, for example, a standard color space in the printing business, such as an XYZ space or an Lab space, or a standard color space in each manufacturer may be used. Alternatively, a representative color space for a color printer may be used. That is, the specific color space is not an arbitrary, unknown color space which is to be printed and is unique to a color printer, but is any known color space which can be used as a standard color space. By using such a standard color space, information about the standard color space is required on the host computer side, unlike the first embodiment, but no information about the color characteristics of each color printer is required as in the first embodiment. In addition, the same processing may be performed with respect to all types of color printers. FIG. 6 corresponds to FIGS. 2A and 2B and shows correspondence data of representative points in an input color space and representative points in a specific color space, which data is held in a RAM 4 in FIG. 5.

Fifth, in the first embodiment, since an input color space and an output color space are related to each other through color charts, a discrete correspondence list is used as correspondence data of color chart numbers and output image data values. In contrast to this, in the second embodiment, since the two color spaces are related to each other through a specific color space, mathematical conversion formulae are used as correspondence data. That is, the relationship between a specific color space and a color space unique to the image forming unit can be determined at the time of shipment, and hence corresponding conversion formulae can be determined. More specifically, the conversion formulae are held in a ROM 5 in the form of conversion programs for gradation conversion and masking conversion, which are described previously with reference to the first embodiment, and corresponding coefficient values. Similarly, the relationship between the color space of input image data and unique color space can be expressed in the form of conversion formulae, instead of a discrete correspondence list, without departing from the gist of the present invention.

Similar to the first embodiment, in the second embodiment, since an input color space and an output color space are related to each other through a specific color space, conversion coefficients used for conversion from the input color space to the output color space can be calculated.

As a special example of the specific color space, a color space unique to a printer may be used. In this case, unlike the embodiments described above, information about a color space output from the color printer is required on the host computer side, and different processes are required for the respective types of printers. Even in this case, similar to the above-described embodiments, conversion coefficients for conversion from the input color space to the output color space can be calculated by receiving a correspondence list of representative points of the input color space and representative points in the output color space from the host computer.

In the above embodiments, R, G, and B image data received from the host computer are output as C, M, Y, and K image data. However, the received R, G, and B image data may be output in other forms. For example, if an output device such as a CRT display or an LCD display is used, the received R, G, and B image data may be output as R, G, and B image data. A problem is not posed in the form of data but posed in the fact that even if combinations of identical R, G, and B data values are set, the meanings of respective data values, i.e., the positions intended by the user on the absolute color space, can differ from each other.

In the above embodiments, raster image data received from the host computer is output upon color space conversion. However, color PDL (Page Description Language) data may be received and may be converted into raster image data to be written in the image memory 7. In this case, color space conversion may be performed by the method based on hardware as in the first embodiment or may be performed by the method based on software in a developing operation as in the second embodiment.

(Third Embodiment)

Figure 7:
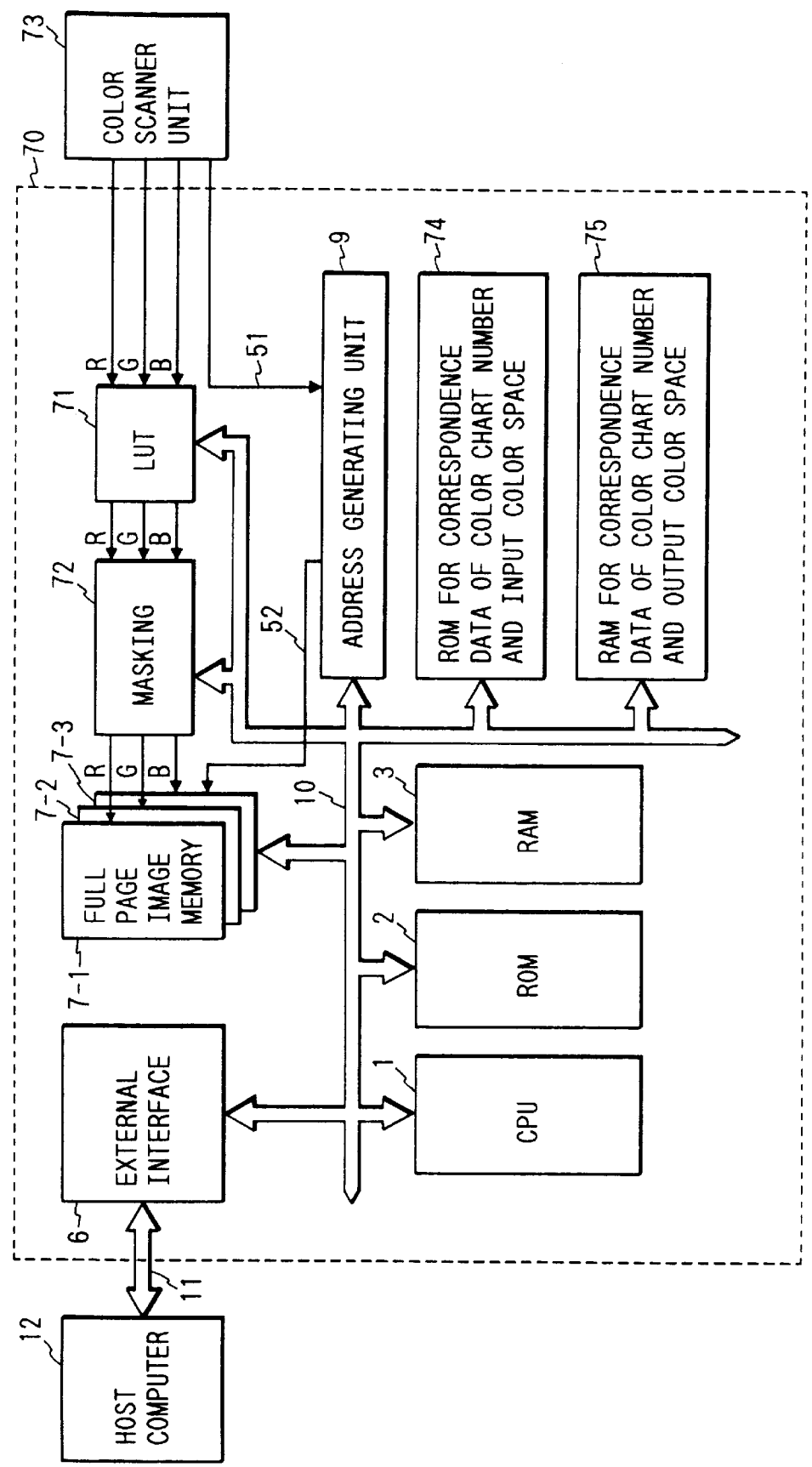
FIG. 7 is a block diagram showing an image processing apparatus according to the third embodiment of the present invention.

FIG. 7 is a block diagram showing an image processing unit 70 for a color scanner unit 73 according to the third embodiment of the present invention.

In contrast to the first embodiment, an image read by a color scanner unit 73 is converted into an arbitrary color space by an LUT circuit 71 and a masking circuit 72 and is written in image memories 7-1 to 7-4. The LUT circuit 71 performs gradation conversion for each of R, G, and B image data. The masking circuit 72 performs a 3×3 matrix operation. Subsequently, image data read out from the image memories 7-1 to 7-4 by a CPU 1 are sent to a host computer 12 through an external interface 6 and a communication unit 11. A ROM 74 is a ROM for holding a correspondence list of color chart numbers and the data values of input image data read by the color scanner unit 73. These data indicate a color space unique to the color scanner unit 73 and are written in the ROM 74 at the time of shipment in this embodiment. However, such data may be automatically formed by the color scanner unit 73 by reading color charts. These data may be sent from the color scanner unit 73 or input from an operation unit (not shown), or from an IC card or the like. Alternatively, the data may be sent from the host computer 12. When the data are to be externally input, a programmable memory such as a RAM or an EEPROM is used instead of a ROM.

A RAM 75 is a memory for holding a correspondence list of color chart numbers and image data values to be sent to the host computer. In this list, similar to the correspondence data shown in FIGS. 2A and 2B, color chart numbers are related to the data values of the respective color components of images sent to the host computer. These data indicate desired values of image data to be sent to the host computer, viewed from the host computer side, and represent the color space characteristics of image data which the host computer desires to receive. These correspondence lists change in accordance with a color space desired by the host computer. Alternatively, two or more color chart groups as media may be prepared, and a color chart group to be used as a medium may be selected. In this embodiment, these correspondence data are sent from the host computer 12 and are held in the RAM 75. However, the correspondence data may be input from an operation unit (not shown), or from an IC card or the like. The RAM 75 may be integrated with a work RAM 3. Since the color characteristics of an output image are expressed by only the relationship with color charts in this manner, information about the color characteristics of the color scanner is not required on the host computer side. In addition, when an image is to be formed on the host computer side, colors are designated by color chart numbers, and the color chart numbers and the data values of the formed image are held in the form of a list. The list is then sent, as the correspondence data of the color chart numbers and specific points in an output color space, to the image processing unit 70. With this operation, image data values obtained when a given color chart is read by the color scanner unit 73 can be caused to coincide with image data values formed by designating the color chart on the host computer.

In this embodiment, a correspondence list of known color charts and the image data values of an input image is held in the ROM 74 at the time of shipment. Instead of holding this list, unknown color charts may be read by the color scanner unit 73, and the read data may be held in a memory 74 constituted by a RAM. That is, an arbitrary color chart may be registered.

In this embodiment, a color space unique to the scanner and a color space desired by the host computer are related to each other through color charts. However, these spaces may be related to each other through the image data values of a specific color space, similar to the second embodiment. In a special case, the image data values of the color space unique to the scanner and the image data values of the color space desired by the host computer may be directly related to each other.

In the above-described embodiments, color conversion is performed by both the LUT process and the masking process. However, color space conversion may be performed by performing one of these processes. Alternatively, another color space conversion process such as a direct LUT process may be performed.

As color charts in this embodiment, various types of color charts may be used.

As described above, according to the third embodiment, input image data having an arbitrary color space and sent from the host computer can be easily formed by the color image forming apparatus with colors intended by the user. In addition, an image read by the color scanner can be easily converted into an arbitrary color space intended by the user and can be sent to the host computer.

In the third embodiment, as a printer of the image forming unit 8, a printer called a thermal jet printer may be used.

It is essential for the image forming unit 8 to be capable of permanent visual recording, i.e., color hard copying, of a color image.

This point equally applies to other embodiments described below.

According to the third embodiment, color image data can be easily processed with high precision.

In the above embodiments, correspondence data of color charts and input image data is transmitted from the host computer to the printer. In contrast to this, in the following embodiments described below, correspondence data indicating the correspondence between color charts and color image data to be input, as data indicating the color reproduction characteristics of the printer, to the printer to reproduce the colors of color charts is transmitted from the printer to the host computer.

(Fourth Embodiment)

Figure 8:
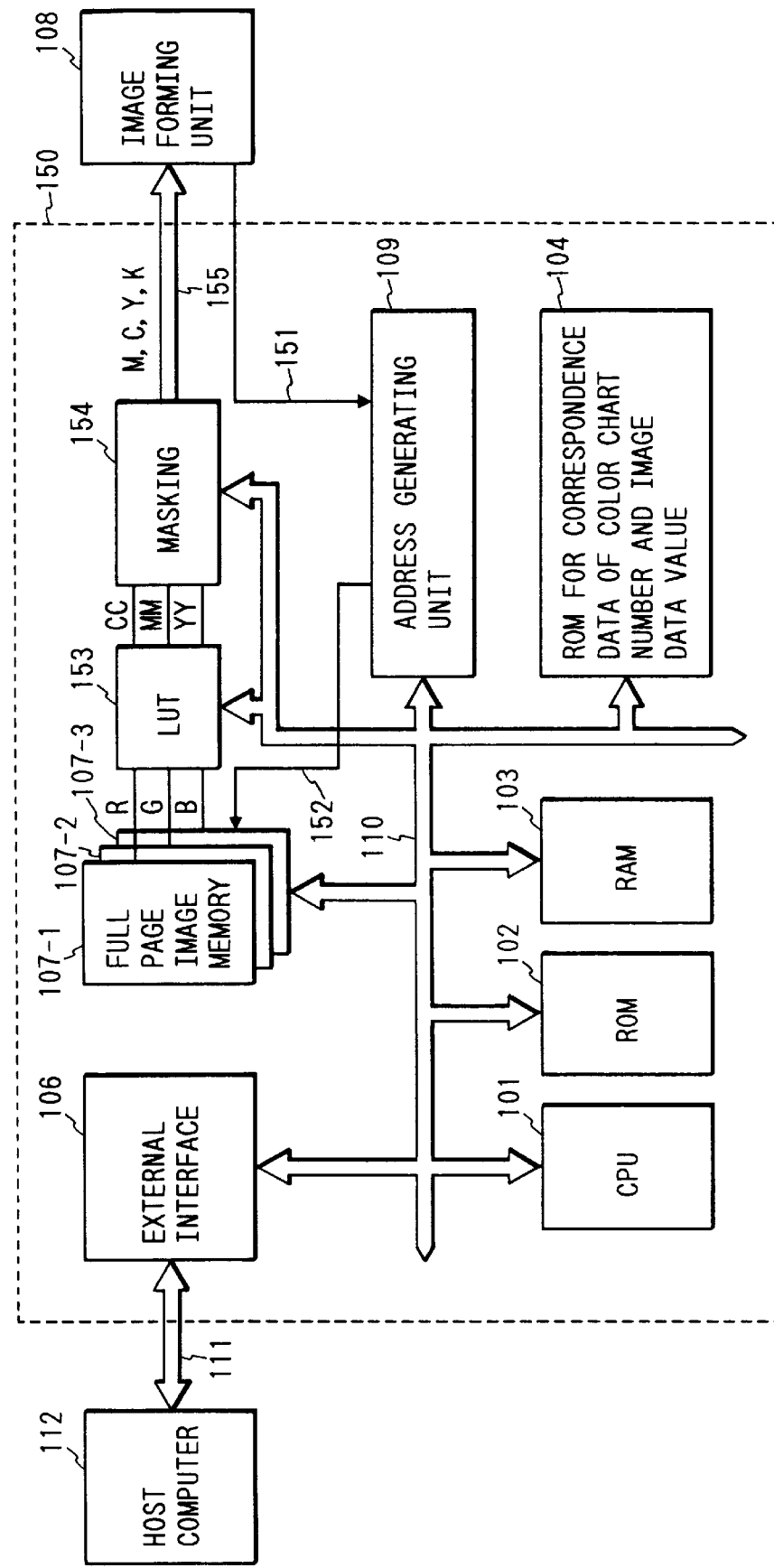
FIG. 8 is a block diagram showing an image forming apparatus according to the fourth embodiment of the present invention.

FIG. 8 is a block diagram showing the arrangement of an image processing apparatus according to the fourth embodiment. In the fourth embodiment, the image processing apparatus is constituted by an image processing unit 150 and an image forming unit 108 as separate units.

As shown in FIG. 8, color image data transmitted from a host computer 112 through an interface 111 and an external interface 106 are written in a full page memory 107 by a CPU 101. In this case, a ROM 102 is used to hold programs. A RAM 103 is used as a work RAM. The CPU 101 controls the respective components in the apparatus through a CPU bus 110.

The full page image memory 107 (to referred be as an image memory hereinafter) is constituted by an R (Red) image memory 107-1, a G (Green) image memory 107-2, and a B (Blue) image memory 107-3, each having a capacity of 8 bits for each color component. That is, the full page image memory 107 is an image memory for holding R, G, and B image data.

When all the image data required for printing one page are set in image memory 107, the CPU 101 instructs the image forming unit 108 to start a print operation.

The image forming unit 108 is, for example, an electrophotographic full color printer and field-sequentially forms images constituted by M (Magenta), C (Cyan), Y (Yellow), and K (blacK) components. When the print operation is started, an address generating unit 109 generates a read address 152 for read-accessing the image memory 107 on the basis of a sync signal 151 sent from the image forming unit 108.

R, G, and B data read out from the image memory 107 in accordance with the address 152 is subjected to gradation conversion in an LUT circuit 153 and is subsequently subjected to RGB/CMYK conversion in a masking circuit 154.

Parameters for these circuits are fixed, unlike the previous embodiments.

The LUT circuit 153 is used to convert the luminance data of input R, G, and B images into density data and perform gradation conversion. The function of the circuit 153 is expressed by the following equations:

$CC=FR(R), 0 \leq R, CC \leq 255$ $MM=FG(G), 0 \leq G, MM \leq 255$ $YY=FB(B), 0 \leq B, YY \leq 255$ Examples of these equations are:

$CC=255-R$ $MM=255-G$ $YY=255-B$

The masking circuit 154 is used to convert gradation-converted C, M, and Y image data into C, M, Y, and K image data. The function of the masking circuit 154 is expressed by a 4×4 matrix operation, as indicated by the following formula (KK=min (CC, MM, YY):

$$\begin{bmatrix} C \\ M \\ Y \\ K \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} \begin{bmatrix} CC \\ MM \\ YY \\ KK \end{bmatrix}$$

An example of this formula is:

$$\begin{bmatrix} C \\ M \\ Y \\ K \end{bmatrix} = \begin{bmatrix} 1.0 & 0.0 & 0.0 & -0.5 \\ 0.0 & 1.0 & 0.0 & -0.5 \\ 0.0 & 0.0 & 1.0 & -0.5 \\ 0.0 & 0.0 & 0.0 & 1.0 \end{bmatrix} \begin{bmatrix} CC \\ MM \\ YY \\ KK \end{bmatrix}$$

A RAM 104 is a memory for holding correspondence data of color chart numbers and image data values to be input to the image processing unit 150 to reproduce the colors designated by the color chart numbers. A color chart number is a number assigned to each color chart of a specific color chart group. As described above, for example, the pantone (registered trade name) is well known as a color chart group. In addition to this color chart group, various color chart lists are available from printing companies. Such color chart groups include several tens to several hundreds color charts depending on their types. An image data value is a combination of numerical values of specific color components, which combination expresses a color. In this embodiment, each of R, G, and B color components is expressed by 8 bits. FIGS. 9A and 9B show examples of this correspondence data. A combination of R, G, and B data values of image data is related to each color chart number. FIG. 9A shows a correspondence list of each color chart of company A and image data values. Since different types of printers have different color reproduction ranges and different color reproduction characteristics, the respective types of printers have different correspondence lists. Therefore, such a correspondence list is called a profile of a printer. The manner of expressing a profile is not limited to this. A profile may be expressed by other functions. In this embodiment, these correspondence data are written, as data unique to the image forming unit, in the RAM 104 at the time of shipment. However, a RAM may be arranged instead of the ROM 4, and data may be sent from the image forming unit 108 to the RAM, or may be input from an operation unit (not shown) or from an IC card or the like. When a plurality of types of image forming units can be connected to the same image processing unit, correspondence data are transmitted from the image forming units, or correspondence data corresponding to the plurality of types of image forming units are set in the RAM 104 so as to be selectively used in accordance with the type of unit actually connected to the image processing unit. The ROM 104 may be integrated with a program ROM 102. Furthermore, when correspondence data is to be externally input, an EEPROM or a RAM may be used instead of a ROM.

FIG. 9B shows a correspondence list of each color chart of company B and image data values. In this manner, one apparatus may correspond to a plurality of color chart groups, and a color chart group to be used may be selected. As shown in FIG. 9B, color charts may be specified by character strings representing color chart names or the like instead of color chart numbers.

Such correspondence data of color chart numbers and image data values is transmitted to the host computer, as will be described later. When image data is formed and edited on the host computer side, various color charts are displayed on a display screen, and images are formed and edited by selecting color charts to be used. In this case, an image is held in the form of raster color image data, and image data values corresponding to color charts which can be selected are sent from the image forming unit side. Therefore, an image is edited by using image data values corresponding to selected color charts. The obtained raster image data is transmitted to the image forming unit, thereby performing image formation.

The operator only refers to colors displayed on a display (not shown) and uses color charts on a printed matter as standard color charts, thereby preventing the influences of the type of a display used for display and a change over time. In addition, since given image data values are converted on the host computer side on the basis of a correspondence list sent from the image forming unit side, the image data values can be converted into optimal image data values used for printing color charts by the image forming unit, thus eliminating the influence of a change in the type of image forming unit. In other words, the operator need not consider the color characteristics of an image forming unit, and the number of times of trial printing can be reduced. In addition, since color charts are colors themselves to human eyes, they are preferable as means for allowing the operator to express intended colors.

Figure 10:
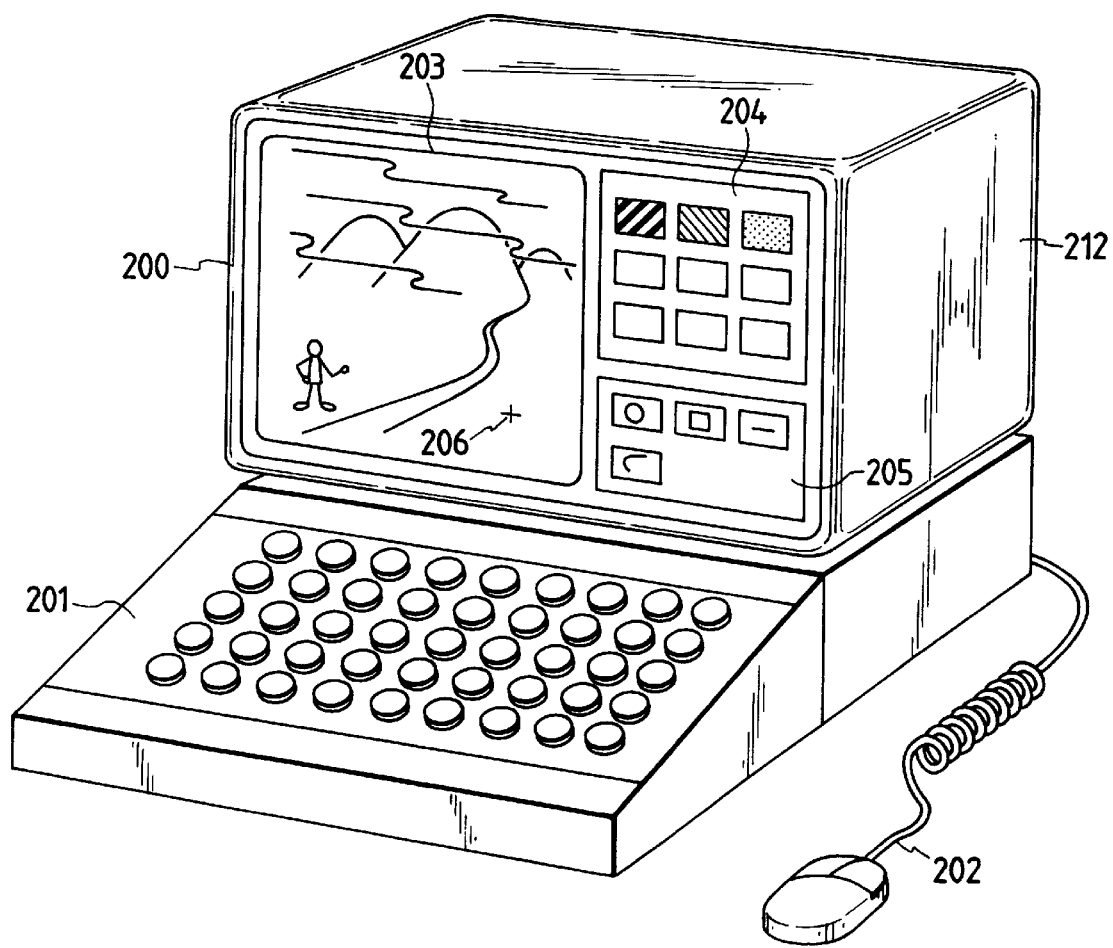
FIG. 10 is a perspective view for explaining an image forming operation in a computer 212.

FIG. 10 is a perspective view for explaining an example of the above-described image forming operation on the computer side. A computer 212 has a keyboard 201, a color display 200, and a mouse 202. An image 203 which is being edited is displayed on the color display 200 together with a cursor 206 which moves upon movement of the mouse 202. Color charts are displayed in the respective colors on a color chart display region 204. On an edit designation region 205, icons representing various edit processes, e.g., a circle input process, a straight line input process, and a character input process, are displayed. In editing an image, an edit process to be performed is selected by the mouse 202, and a color chart representing a color to be used is designated by the mouse 202.

Subsequently, a portion, of the image 203, which is to be edited is designated and edited. The image 203 is held in a hard disk, a main memory, or a display memory in the computer 212 in the form of raster image data. Editing is performed as follows. Each color component data corresponding to the designated color chart is obtained from the correspondence data of color chart numbers and image data values, and the raster image data of the image 203 is updated by using each color component data. In the above case, a color chart is displayed in its color on the color display 200. However, this color chart may be displayed in number.

Figure 11:
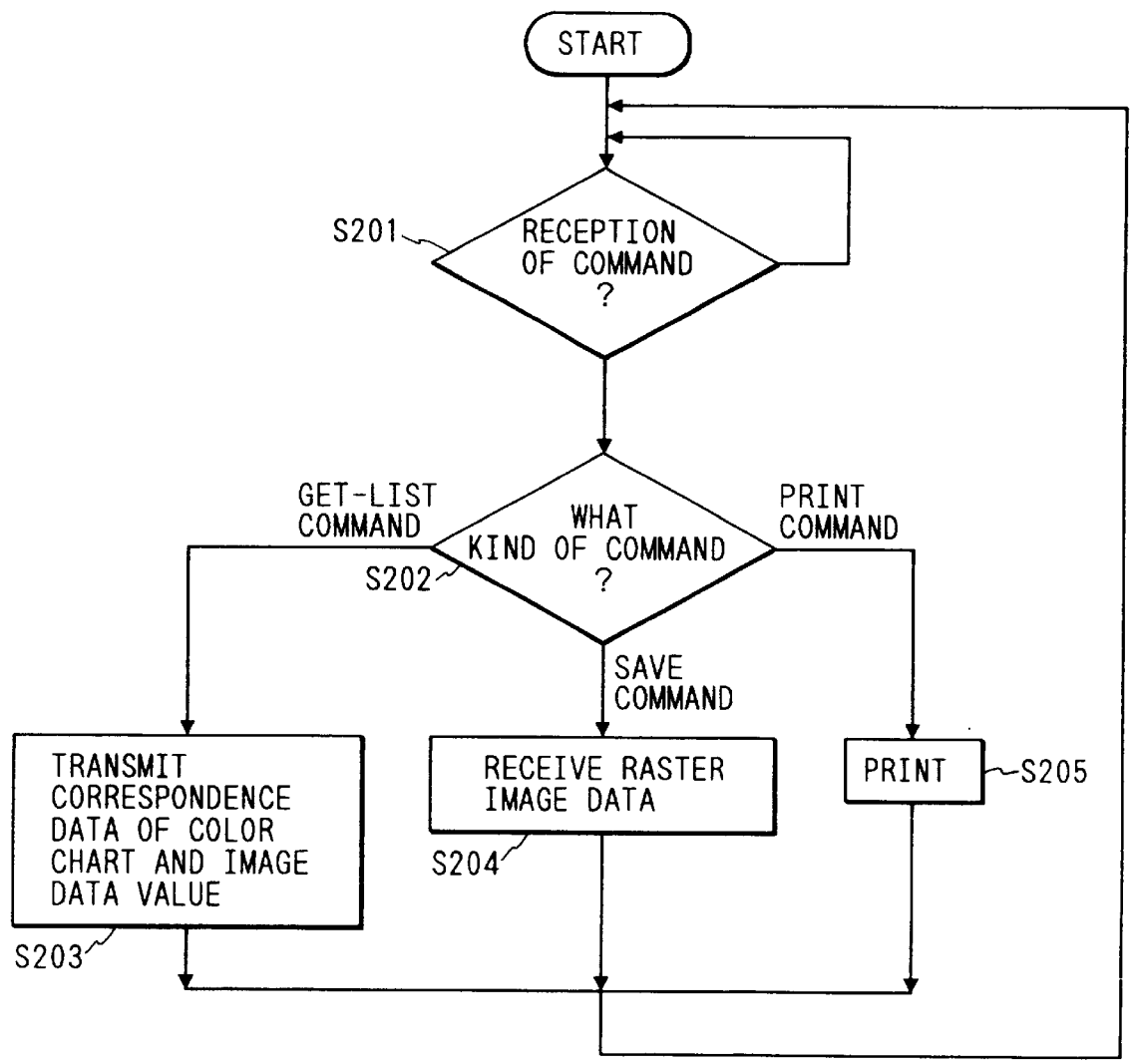
FIG. 11 is a flow chart showing a control sequence in the fourth embodiment.

The flow of control in the image processing unit 150 in the fourth embodiment will be described below with reference to the flow chart shown in FIG. 11.

In step S201, the flow waits until a command is received from the host computer 112. Upon reception of the command, the flow advances to step S202 to discriminate a command type. If the command is a "GET_LIST" command, the "correspondence data of the color chart numbers and the image data values" shown in FIGS. 9A and 9B and stored in the RAM 104 is transmitted to the host computer 112 in step S203. If the command is a "SAVE" command, image data from the host computer 112 are received and written in the image memory 107 in step S204. If the command is a "PRINT" command, the image forming unit 108 is started in step S205, and the contents of the image memory 107 are read out. The R, G, and B image data are then converted into C, M, Y, and K image data by the LUT circuit 153 and the masking circuit 154. The image data are then transmitted to the image forming unit 108 to form an image.

In the fourth embodiment, image data are transmitted through an image signal line 155 in response to the sync signal 151, i.e., image data are transmitted by using a so-called video I/F. However, data transmission may be performed through a general asynchronous type interface such as a GPIB or an SCSI. This general asynchronous type interface is also used to send a print start command and the like to the image forming unit. In this case, since the transfer speed is generally lower than the image forming speed of the image forming unit, an image memory for speed conversion is required in the image forming unit.

By transmitting the "correspondence data of color chart numbers and image data values" from the image forming apparatus side to the host computer in this manner, color charts designated on the host computer in an image forming operation can be converted into optimal image data values for image formation on the image forming apparatus side, thereby allowing the user to form images with intended colors by using the color image forming apparatus.

(Fifth Embodiment)

The fifth embodiment of the present invention will be described in detail below with reference to the accompanying drawings.

Figure 12:
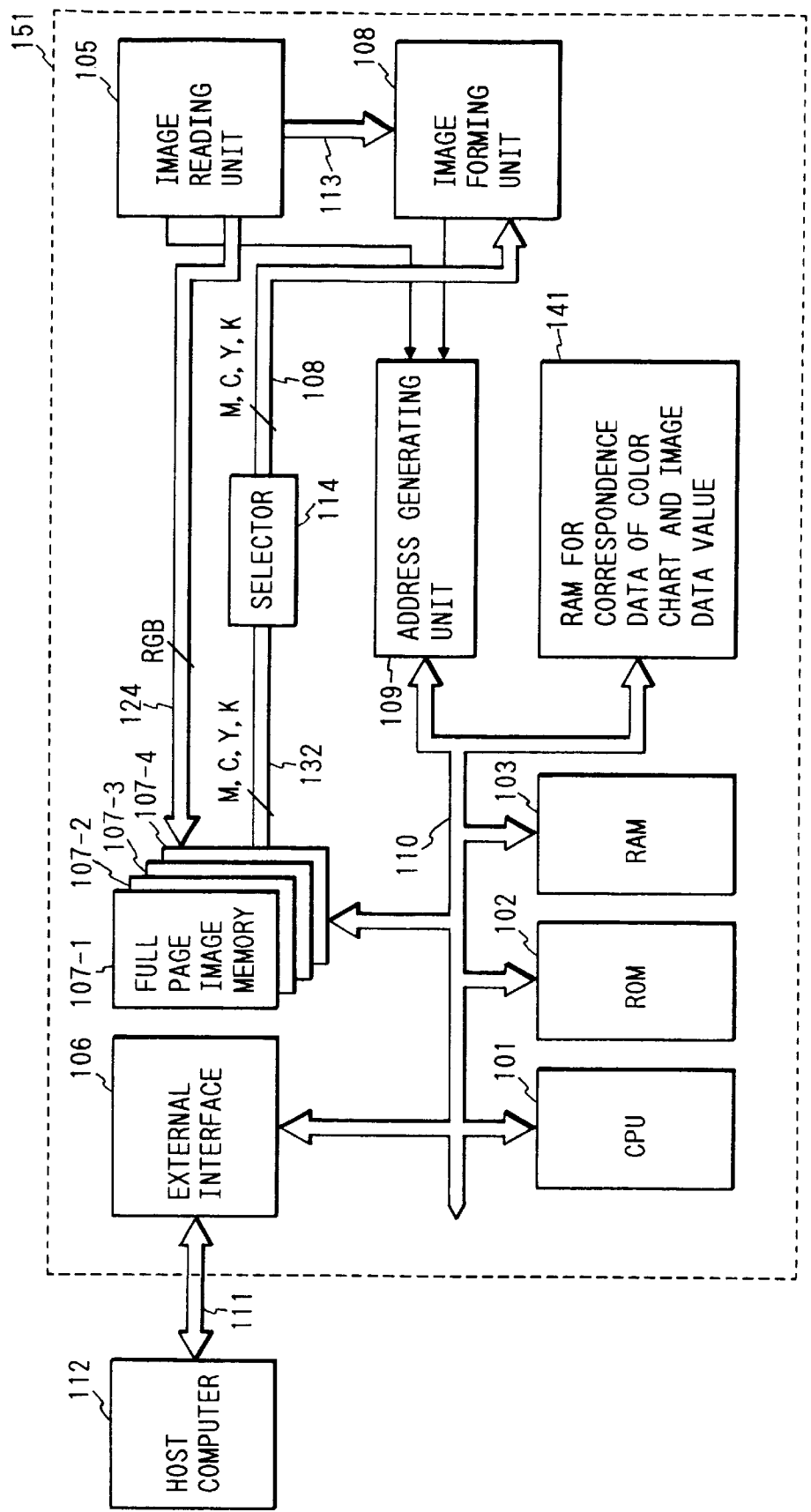
FIG. 12 is a block diagram showing an image forming apparatus according to the fifth embodiment of the present invention.

FIG. 12 is a block diagram showing an image forming apparatus 151 according to the fifth embodiment.

The fifth embodiment is different from the fourth embodiment in the following points. First, in the fourth embodiment, the image processing unit 150 and the image forming unit 108 are designed as separate units. In the fifth embodiment, however, these units are integrated into one unit, and the unit further includes an image reading unit 105. More specifically, in the fifth embodiment, the apparatus further includes the image reading unit 105, and the image reading unit 105 and the image forming unit 108 are directly connected to a video interface 113 so that the apparatus also serves as a color copying machine.

Second, in the fourth embodiment, the image memory 107 is constituted by the R, G, and B image memories to receive raster image data of the RGB scheme from the host computer. In the fifth embodiment, however, an image memory 107 is constituted by four color component memories (107-1 to 107-4) for storing C, M, Y, and K data so that raster image data of the CMYK scheme are received also from the host computer, and image data values used for the "correspondence data of color chart numbers and image data values" are also described in the four color components C, M, Y, and K. The C, M, Y, and K image data held in the image memory 107 are selected by a selector 114 in accordance with which color components are formed by the image forming unit 108. The selected image data are directly supplied to the image forming unit 108 to be printed. For this reason, C, M, Y, and K image data are closely related to the color characteristics of the image forming unit 108.

More specifically, assume that the color characteristics of the image forming unit change over time. In the arrangement of the first embodiment, when R, G, and B data are converted into C, M, Y, and K data, image processing parameters which can absorb the change can be selected. In the fifth embodiment shown in FIG. 12, the change cannot be absorbed. In the fifth embodiment, therefore, as will be described later, a change in the color characteristics of the image forming unit is absorbed by setting the "correspondence data of color chart numbers and image data values" in consideration of the change.

Figure 13A:
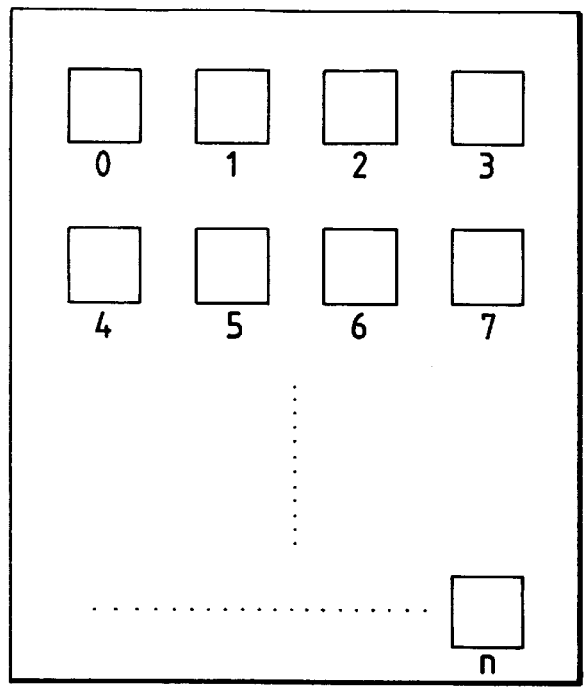
FIGS. 13A and 13B are views for explaining a method of correcting correspondence data.
Figure 13B:
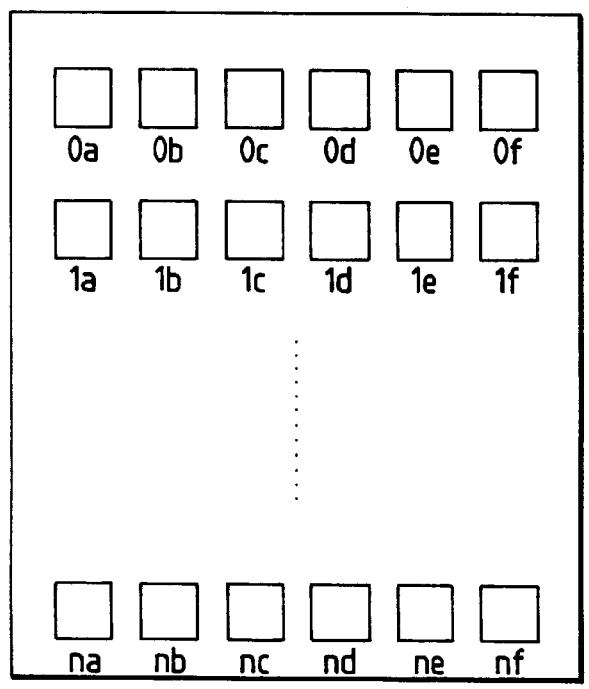

Third, in the fifth embodiment, the "correspondence data of color chart numbers and image data values" is held in a RAM 141 so as to be updated in accordance with a change in the color characteristics of the image forming unit 108. More specifically, a printed matter (shown in FIG. 13A) of a color chart group available from company A is read by the image reading unit 105, and the read values are stored beforehand, as reference data Ao to Au, in a RAM 103. A plurality of density data set in accordance with standard image data values corresponding to each color chart (e.g., chart 0) of company A are formed in the image memory 107 by a CPU 101 to be printed out in the form shown in FIG. 13B (e.g., 0a to 0f). The density data are then printed by the image forming unit 108. In such a printing operation, density data na to nb corresponding to a color chart are also printed out.

Subsequently, the print result is read by the image reading unit 105, and the obtained data are compared with the reference data stored in the RAM 103. For example, of data Da to Df obtained by reading the printed images 0a to 0f corresponding to color chart 0, data which is closest to a signal A0 obtained by reading color chart 0 is selected, thereby determining an optimal image data value corresponding to each respective color chart. In this case, the image data used for a test output of the read value closest to the reference data may be used. However, if the reference data is located in the middle of a plurality of test outputs, it is preferable that an image data value be determined by interpolating the image data values of these test outputs.

The above-described "correspondence data of color chart numbers and image data values" may be corrected on the basis of such a determination. With this operation, proper processing can be performed with respect to a change in the color characteristics of the image forming unit 108. Furthermore, in this embodiment, when the "correspondence data of color chart numbers and image data values" is to be corrected, no processing needs to be performed by the host computer 112, and the load of the host computer 112 can be reduced.

Note that when image data are to be read, the image memory 107 is used as R, G, and B memories (107-1 to 107-3), and the image data read by the image reading unit 105 are written in the image memory 107.

An electronic device in this embodiment may be the host computer 112 or the image processing unit 150.

Note that this embodiment may be applied not only to a system constituted by a plurality of devices but also to an apparatus constituted by one device. It is apparent that the embodiment can be applied to a case wherein image data processing can be performed by supplying programs to a system or an apparatus.

As has been described above, according to this embodiment, images can be formed in colors intended by the operator.

Since the profile of the image forming unit is read by the host computer 112, and color image data is processed on the host computer side in accordance with the color reproduction characteristics of the image forming unit, image processing can be freely performed on the host computer side.

What is claimed is:

1. An image processing apparatus comprising:

image input means for inputting input image data corresponding to an input color space;

color space conversion means for converting the input image data into output image data corresponding to an output color space different from the input color space; and correspondence data input means for inputting representative point correspondence data which shows a relationship between a representative point which is represented as a color chart number in the input color space and a corresponding representative point which is representative in the output color space, wherein the representative point in the input color space and the corresponding representative point in the output color space represent a same color, and wherein color space conversion characteristics of said color space conversion means are determined on the basis of a plurality of representative point correspondence data input from said correspondence data input means.

2. An apparatus according to claim 1, wherein a representative point in the output color space is a point indicating a color represented by data for identifying a color chart.

3. An apparatus according to claim 1, wherein said image input means and said correspondence data input means input data from the same host computer.

4. An apparatus according to claim 2, wherein the input image data is R, G, and B data.

5. An apparatus according to claim 1, wherein the output image data is C, M, Y, and K data.

6. An apparatus according to claim 1, wherein the correspondence data is data indicating correspondence between data for identifying the color chart and the R, G, and B data.

7. An image processing method comprising the steps of:

inputting input image data corresponding to an input color space;

converting the input image data into output image data corresponding to an output color space different from the input color space by color space conversion means; and inputting representative point correspondence data which shows a relationship between a representative point which is reresented as a color chart number in the input color space and a corresponding representative point which is representative in the output color space, wherein the representative point in the input color space and the corresponding representative point in the output color space represent a same color, and wherein color space conversion characteristics of said color space conversion means are determined on the basis of a plurality of representative point correspondence data input in said representative point correspondence data inputting step.

8. A method according to claim 7, wherein a representative point in the output color space is a point indicating a color represented by data for identifying a color chart.

9. A method according to claim 7, wherein the input image data and the representative point correspondence data are inputted from the same host computer.

10. A method according to claim 8, wherein the input image data is R, G, and B data.

11. A method according to claim 7, wherein the output image data is C, M, Y, and K data.

12. A method according to claim 7, wherein the correspondence data is data indicating correspondence between data for identifying the color chart and the R, G, and B data.

* * * * *

UNITED STATES PATENT AND TRADEMARK OFFICE
CERTIFICATE OF CORRECTION

PATENT NO. : 5,915,075

DATED : June 22, 1999

INVENTOR(S) : Toshihiro Kadowaki

It is certified that error appears in the above-identified patent and that said Letters Patent is hereby corrected as shown below:

<u>ON TITLE PAGE</u>

[56] References Cited, under OTHER PUBLICATIONS: "Reterence Manual," should read --Reference Manual,--.

<u>COLUMN 6</u> line 32, "chart;" should read --chart,--.

UNITED STATES PATENT AND TRADEMARK OFFICE
CERTIFICATE OF CORRECTION

PATENT NO. : 5,915,075

DATED : June 22, 1999

INVENTOR(S) : Toshihiro Kadowaki

It is certified that error appears in the above-identified patent and that said Letters Patent is hereby corrected as shown below:

COLUMN 7 line 38, "commands" should read --command,--.
    line 65, "dprocessing apparatusage" should read --diagram showing an image--.

COLUMN 11 line 32, "(to referred be" should read --(to be referred--.

Signed and Sealed this

First Day of February, 2000

Attest:

Attesting Officer

Q. TODD DICKINSON

Acting Commissioner of Patents and Trademarks